(12) United States Patent
Fowler

(10) Patent No.: US 10,114,984 B2
(45) Date of Patent: Oct. 30, 2018

(54) SYMMETRIC BIT CODING FOR PRINTED MEMORY DEVICES

(71) Applicant: Xerox Corporation, Norwalk, CT (US)

(72) Inventor: Jeffrey Michael Fowler, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/255,435

(22) Filed: Sep. 2, 2016

(65) Prior Publication Data

US 2017/0068830 A1     Mar. 9, 2017

Related U.S. Application Data

(60) Provisional application No. 62/214,606, filed on Sep. 4, 2015.

(51) Int. Cl.
G06K 7/00      (2006.01)
G06K 19/077    (2006.01)

(52) U.S. Cl.
CPC ....... G06K 7/0013 (2013.01); G06K 19/0772 (2013.01)

(58) Field of Classification Search
USPC .......................... 235/449, 493; 375/340, 349; 365/185.03, 184
See application file for complete search history.

(56) References Cited

U.S. PATENT DOCUMENTS

| | | | | |
|---|---|---|---|---|
| 5,288,981 A | * | 2/1994 | Davis ............... | G06K 19/06187 235/449 |
| 5,889,698 A | * | 3/1999 | Miwa .................. | G11C 11/5621 365/184 |
| 7,127,004 B1 | * | 10/2006 | Sonning ............ | H03M 13/2707 375/295 |
| 7,286,066 B1 | * | 10/2007 | Ho .......................... | H03M 7/40 341/50 |
| 9,008,234 B2 | * | 4/2015 | Ko ........................ | H04L 1/0041 375/261 |
| 2008/0244349 A1 | * | 10/2008 | Sukegawa ............. | G06F 13/385 714/746 |
| 2011/0154503 A1 | * | 6/2011 | Stewart ................. | G06F 21/125 726/26 |
| 2013/0132652 A1 | * | 5/2013 | Wood .................. | G06F 12/0246 711/103 |

(Continued)

Primary Examiner — Allyson Trail
(74) Attorney, Agent, or Firm — Simpson & Simpson, PLLC

(57) ABSTRACT

A printed memory reader adapted to determine an original value from a printed memory device including a plurality of contact pads and an encoded value created by encoding the original value. The encoded value including N bits of data, where N is equal to a number of bits of data stored in the printed memory device. The printed memory reader includes a plurality of probes arranged to contact the plurality of contact pads and a memory storage element including instructions programmed to execute the steps: a) reading the encoded value or an inverse encoded value from the printed memory device using the plurality of probes to obtain a read value; and, b) decoding the read value to obtain a decoded value equal to the original value. The printed memory reader further includes a processor arranged to execute the instructions.

20 Claims, 12 Drawing Sheets

(56) References Cited

U.S. PATENT DOCUMENTS

| | | | |
|---|---|---|---|
| 2014/0095956 A1* | 4/2014 | Ozdemir | G06F 11/1048 |
| | | | 714/755 |
| 2015/0019799 A1* | 1/2015 | Higo | G11C 7/1006 |
| | | | 711/103 |
| 2016/0057437 A1* | 2/2016 | Jeong | H04N 19/426 |
| | | | 375/240.25 |
| 2017/0186500 A1* | 6/2017 | Motwani | G11C 29/44 |
| 2018/0012642 A1* | 1/2018 | Rodriguez-Latorre | |
| | | | G11C 11/2273 |

* cited by examiner

SYMMETRIC BIT CODING FOR PRINTED MEMORY DEVICES

CROSS-REFERENCE TO RELATED APPLICATIONS

This patent application claims the benefit under 35 U.S.C. § 119(e) of U.S. Provisional Patent Application No. 62/214,606, filed Sep. 4, 2015, which application is incorporated herein by reference.

TECHNICAL FIELD

The presently disclosed embodiments are directed to providing bit coding, more particularly to encoding and decoding N-bit memory devices, and even more particularly to encoding and decoding N-bit memory devices such that orientation of a memory device relative to a reader does not alter the determination of memory device contents.

BACKGROUND

Printed memory (PM) labels and devices are manufactured in a variety of sizes, including twenty (20) bit, which has a symmetrical arrangement of electrical contacts or contact pads. An example of a 20-bit PM is depicted in FIG. 1. In some instances, the orientation of label or device 20 and thereby pads 22 relative to reader 24 may be upside down, either due to symmetry of the carrier body or for compatibility among multiple configurations (See, e.g., FIG. 3 versus FIG. 4). With the standard configuration of PM label 20, reader 24 can read and write an upside-down label, with the effect of reversing the order of the bits.

The present disclosure addresses a method for encoding and decoding N-bit data so that label to reader orientation does not alter the determined value of a printed memory label.

SUMMARY

For an N-bit label, there are $2^N$ possible states, including mostly non-palindromes and a few palindromes. This leaves $O(2^{(N-1)})$ distinct states. The present disclosure provides an encoding mapping $f$ from "data" states to "encoded" states, and a decoding mapping $g$ from "encoded" states to "data" states, where g recovers the original data even if the encoded state is reversed before decoding. In an embodiment, the present method analyzes a sequence of symmetrically oriented pairs in the encoded state. For each pair, if the bit values are identical, their shared value is retained and that embodiment of the present algorithm moves to the next pair. If the bit values in a pair are not identical, they are used to establish a reading direction and the remaining bits are collected as a group. Each pairwise comparison is a dictionary split, catching half as many cases as the previous comparison, until the only remaining values are palindromes.

In another embodiment, distinct encoded states are enumerated to establish a mapping. Specifically, those encoded states which are not less than their reverse are listed in a particular order based on triangular numbers. To encode a data state for a label with an even number of bits, the largest triangular number less than or equal to the data state is computed. The index of the triangular number is used for the first half of the encoded state, and the second half of the encoded state is given by the reverse of the remainder when the triangular number is subtracted from the data state. For a label with an odd number of bits, the least significant bit is placed in the center of the encoded state, and the rest of the encoded state is computed based on the even number of remaining bits. To decode an encoded state from a label with an even number of bits, the larger of the encoded state or its reverse is used. The triangular number indexed by the first half of the resulting state is computed. To this is added the reverse of the second half. For a label with an odd number of bits, the center bit is appended to the sum calculated from the even number of remaining bits.

The present disclosure sets forth an embodiment of this type, using a formulation that works for both odd and even values of N, as well as being directly extendible to cover the entire set of solutions to the problem statement via transformations including permutation transformations, symmetric bit-swapping transformations and symmetric bit-flipping transformations. Selection from among this family may be useful for mild encryption, i.e., to make the coding specific to a particular application, device, or user.

Broadly, the present disclosure sets forth a printed memory reader adapted to determine an original value from a printed memory device including a plurality of contact pads and an encoded value created by encoding the original value. The encoded value includes N bits of data, where N is equal to a number of bits of data stored in the printed memory device. The printed memory reader includes a plurality of probes arranged to contact the plurality of contact pads and a memory storage element including instructions programmed to execute the steps: a) reading the encoded value or an inverse encoded value from the printed memory label using the plurality of probes to obtain a read value; and, b) decoding the read value to obtain a decoded value equal to the original value. The printed memory reader further includes a processor arranged to execute the instructions.

Additionally, the present disclosure sets forth a printed memory reader adapted to determine a first value from a printed memory device including a plurality of contact pads and a second value created by encoding the first value. The second value including N bits of data, where N is equal to a number of bits of data stored in the printed memory device. The printed memory reader includes a plurality of probes arranged to contact the plurality of contact pads and a memory storage element comprising instructions programmed to execute the steps: a) reading a third value from the printed memory label using the plurality of probes, wherein the third value is equal to the second value or an inverse of the second value; and, b) decoding the third value to obtain a fourth value equal to the first value. The printed memory reader further includes a processor arranged to execute the instructions.

Moreover, the present disclosure sets forth a method of using a printed memory device for storage and retrieval of an original value. The method includes: a) encoding the original value to form an encoded value having N bits of data, where N is equal to a number of bits of data stored in the printed memory device, such that an alternate value cannot yield an alternate encoded value equal to the encoded value or an inverse encoded value; and, b) storing the encoded value on the printed memory device. In some embodiments, the method further includes: c) reading the encoded value using a printed memory reader to obtain a read value, wherein the read value is the encoded value or the inverse encoded value; and, d) decoding the read value to obtain the original value.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong.

As used herein, the term "inverse", when in conjunction with a string or binary value, e.g., the inverse of a read value or the inverse read value, is intended to mean the reverse order of a particular value. For example, if a read value is "01001101", an inverse of the read value or the inverse read value is "10110010". Moreover, as used herein, the term "palindrome" is intended to mean a number or sequence of characters which reads the same backwards as forwards. For example, read values of "10011011001" and "1100110011" are both palindrome values. Furthermore, as used herein, the term 'average' shall be construed broadly to include any calculation in which a result datum or decision is obtained based on a plurality of input data, which can include but is not limited to, weighted averages, yes or no decisions based on rolling inputs, etc.

Additionally, as used herein, a "truncated value" is intended to mean a string or binary value having its terminal bit removed. For example, the truncated value for the binary value "10110010" is "1011001". Furthermore, as used herein, a "diminished value" is intended to mean a string or binary value having its center bit removed. For example, the diminished value for the binary value "1011001" is "101001".

Moreover, although any methods, devices or materials similar or equivalent to those described herein can be used in the practice or testing of these embodiments, some embodiments of methods, devices, and materials are now described.

The various embodiments of the basic algorithm described herein has been implemented as Excel® functions in Visual Basic for Applications (VBA), together with a small set of more general functions for handling binary numbers. The current implementations handle numbers up to 49 bits, since this is the precision that can be stored in a single numeric Excel® cell. However, it should be appreciated that the present algorithms may include support for larger numbers of bits by storing the data in strings, and/or using a more sophisticated programming language to speed up encoding and decoding operations, e.g., C++ programming language.

Figure 3:
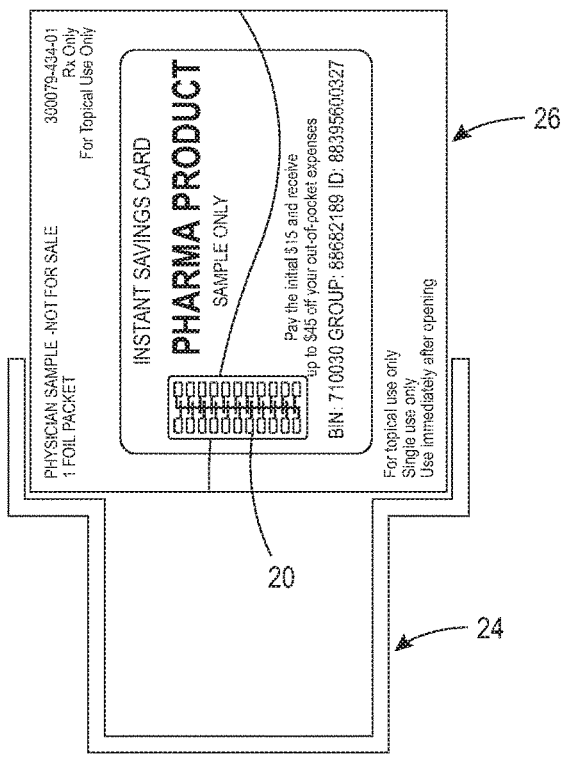
FIG. 3 is a top plan view of an embodiment of a printed memory device entering a reader in a first orientation; and, FIG. 4 is a top plan view of an embodiment of a printed memory device entering a reader in a second orientation one hundred eighty (180) degrees rotated relative to the first orientation.
Figure 4:
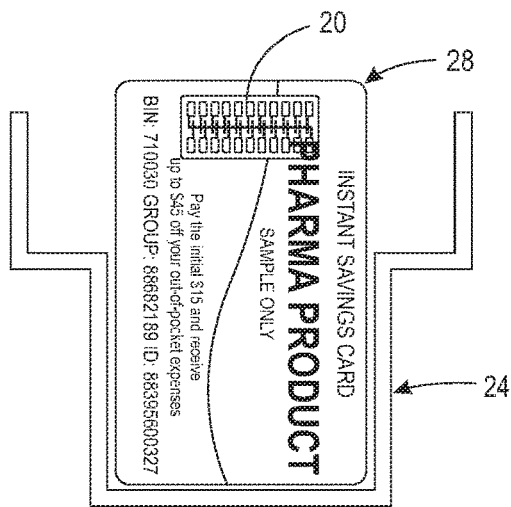
Figure 5:
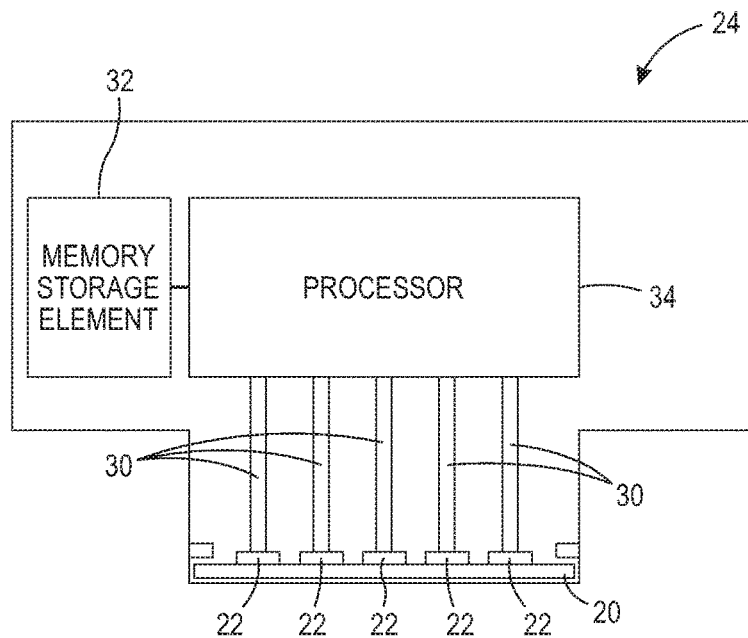
FIG. 5 is a cross-sectional schematic view of an embodiment of a printed memory device reader.
Figure 6:
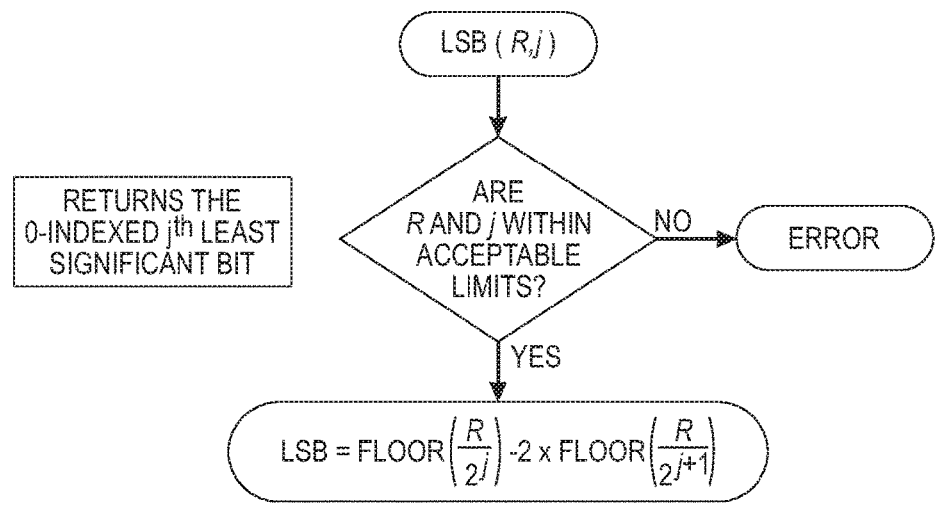
FIG. 6 is a flowchart depicting an embodiment of an algorithm for returning the 0-indexed $j^{th}$ least significant bit.
Figure 7:
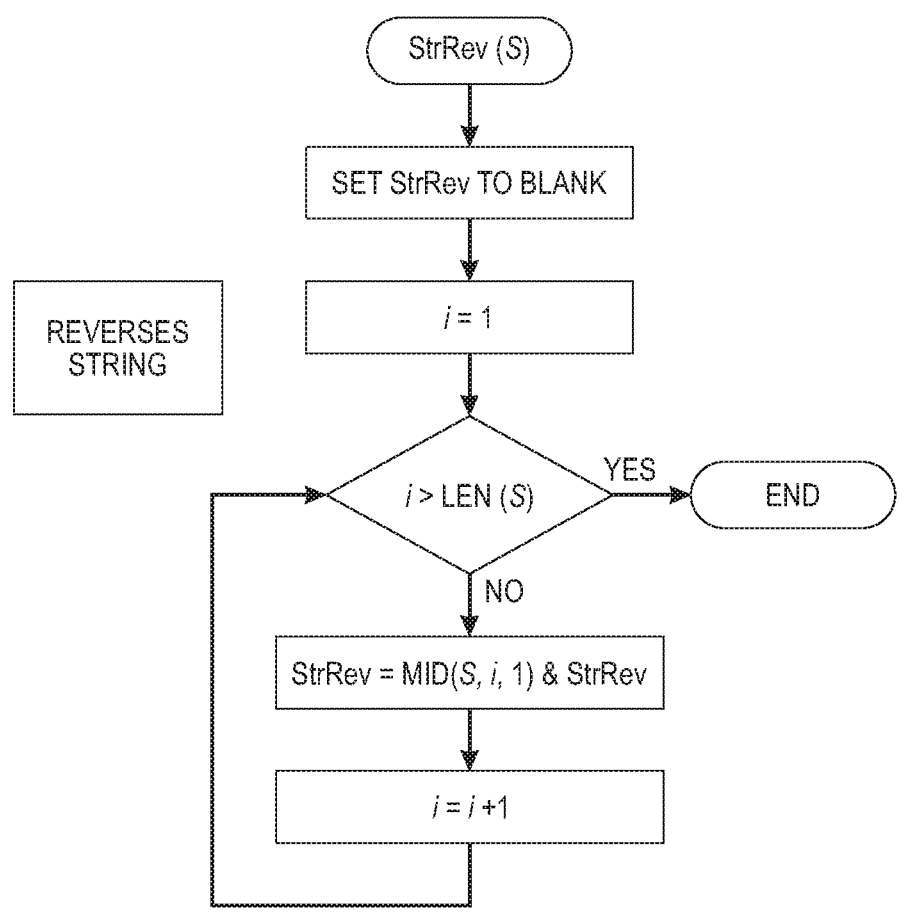
FIG. 7 is a flowchart depicting an embodiment of an algorithm for reversing a string.
Figure 8:
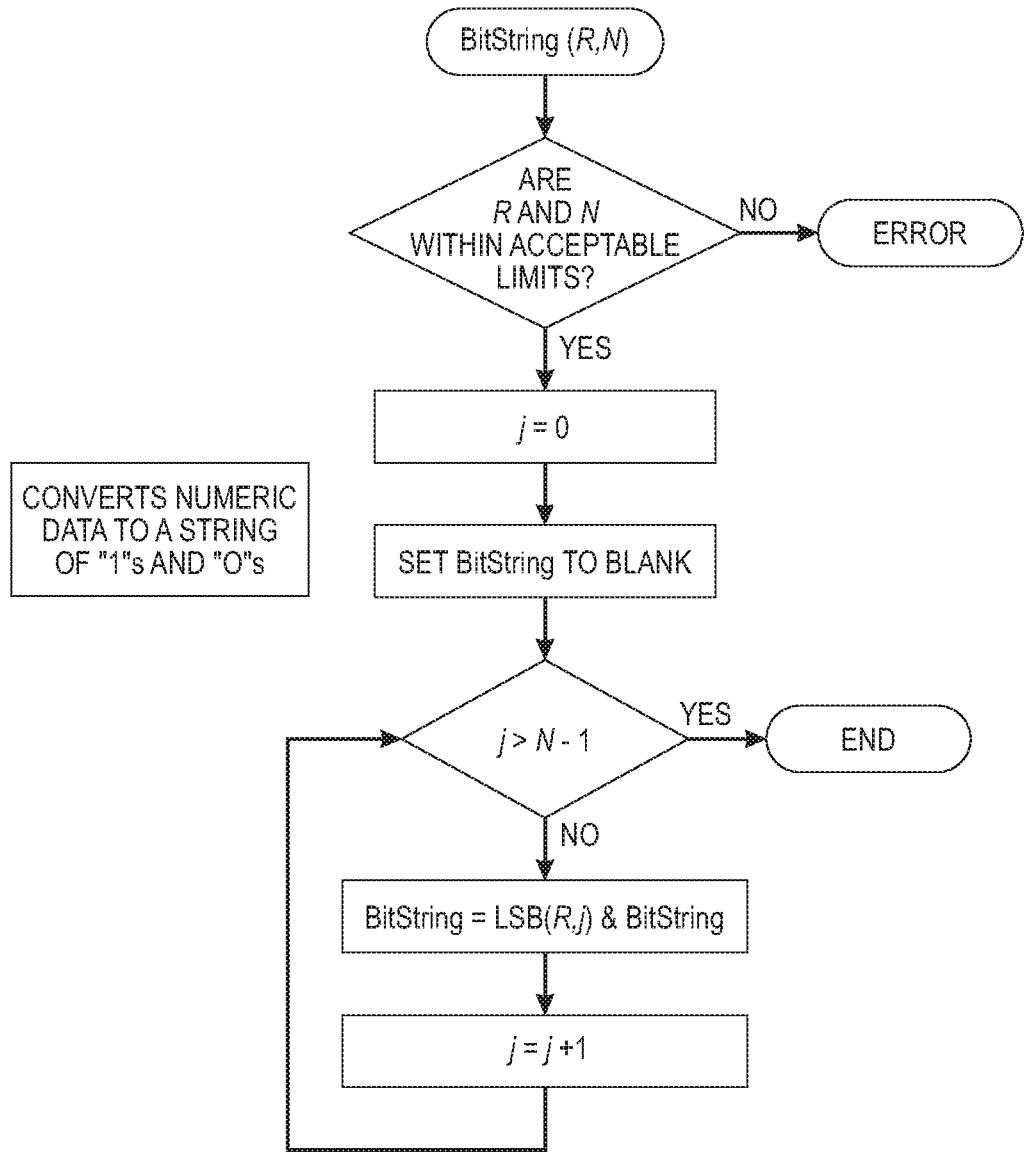
FIG. 8 is a flowchart depicting an embodiment of an algorithm for converting numeric data to a string of "1"s and "0"s.
Figure 9:
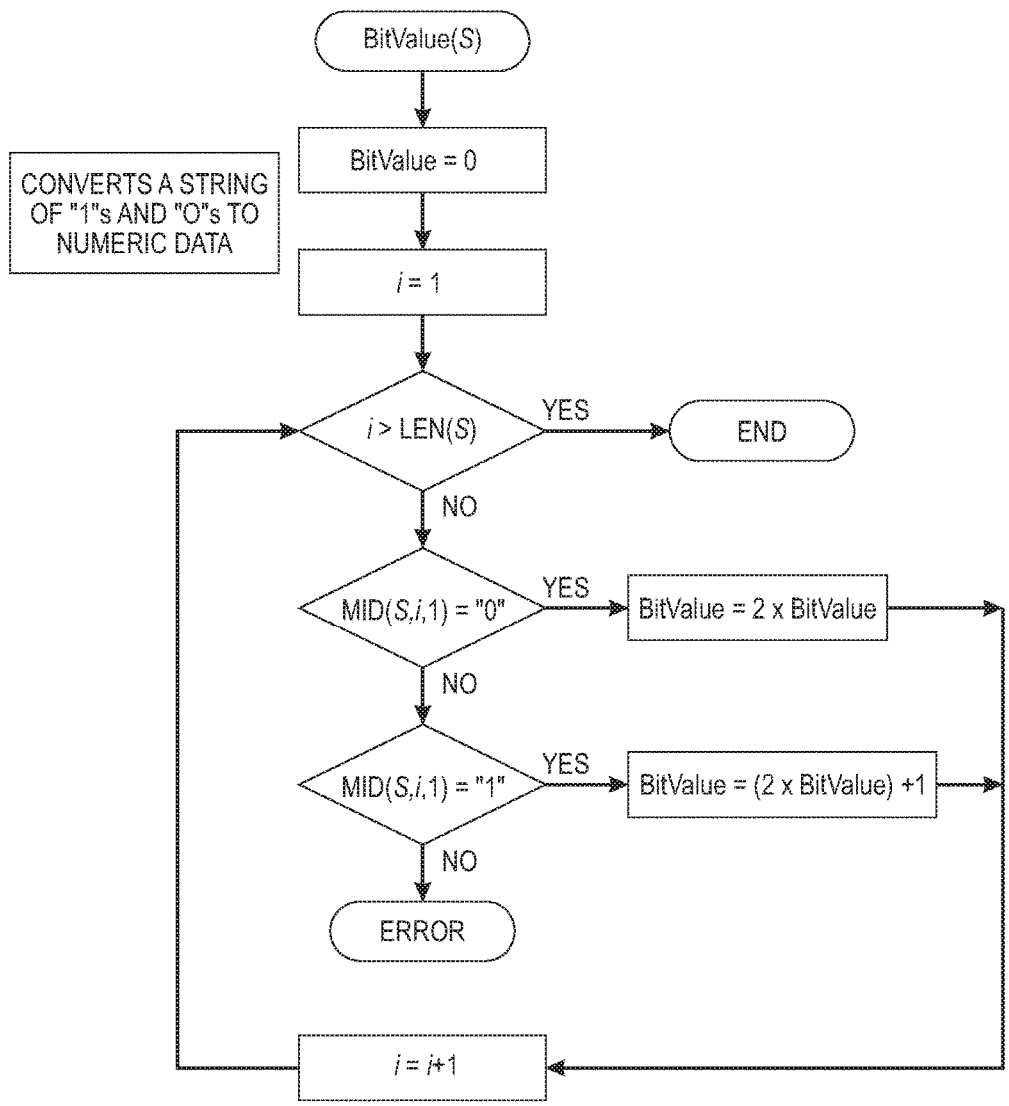
FIG. 9 is a flowchart depicting an embodiment of an algorithm for converting a string of "1"s and "0"s to numeric data.
Figure 10:
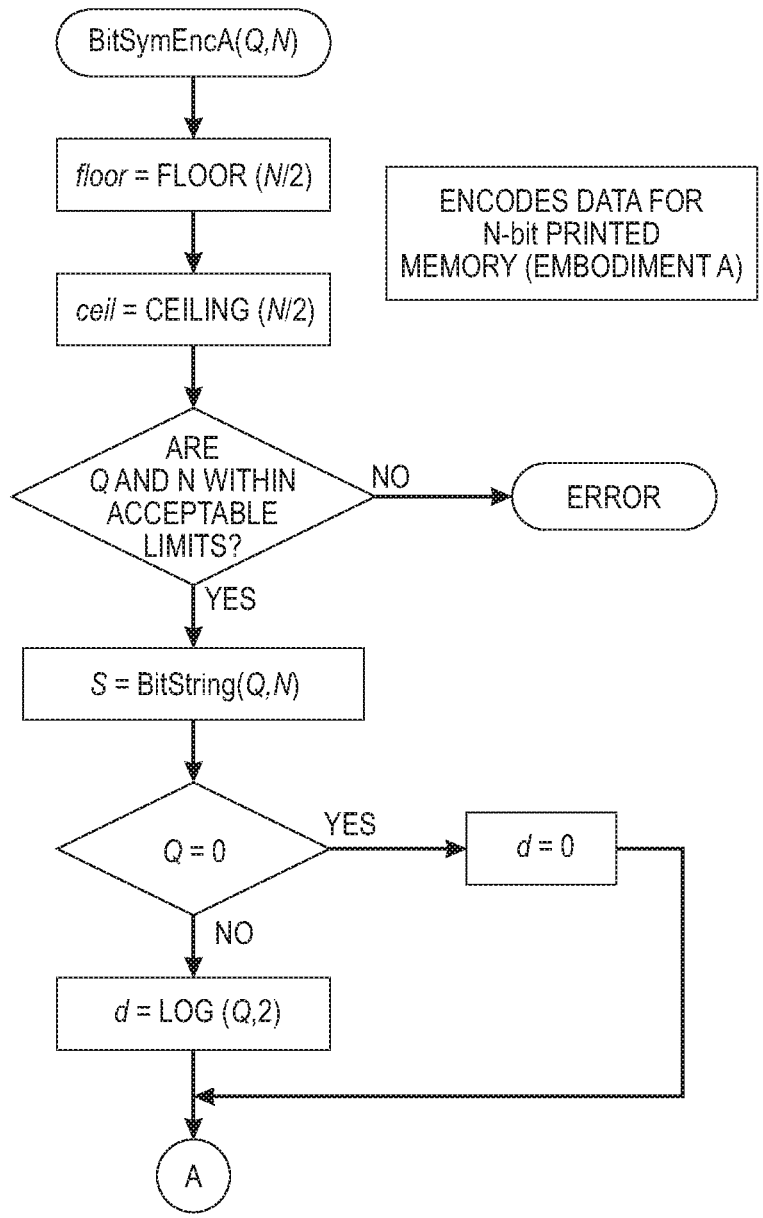
FIG. 10 is a first portion of a flowchart depicting an embodiment of an algorithm for encoding data from N-bit memory, e.g., N-bit printed memory.
Figure 11:
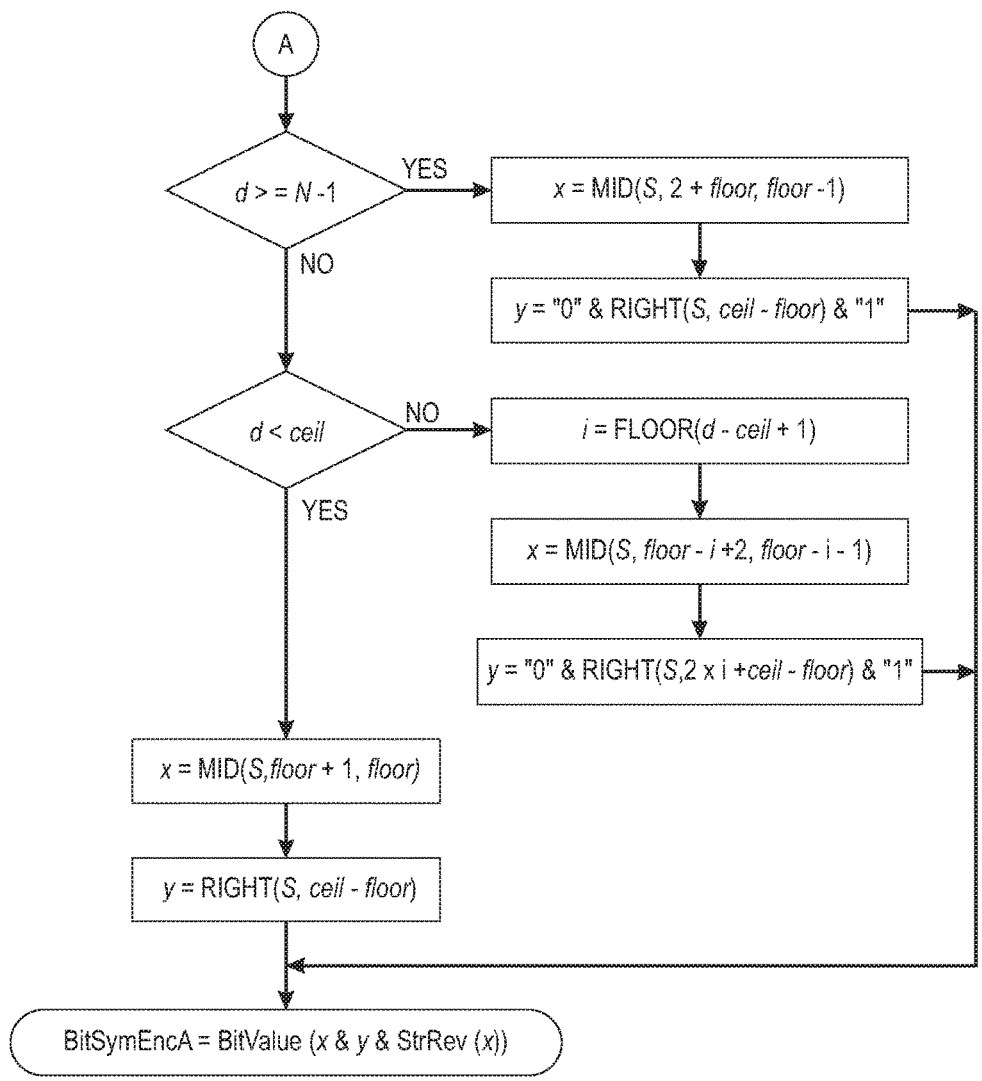
FIG. 11 is a second portion of a flowchart depicting the embodiment of the algorithm for encoding data from N-bit memory, e.g., N-bit printed memory, shown in FIG. 9.
Figure 12:
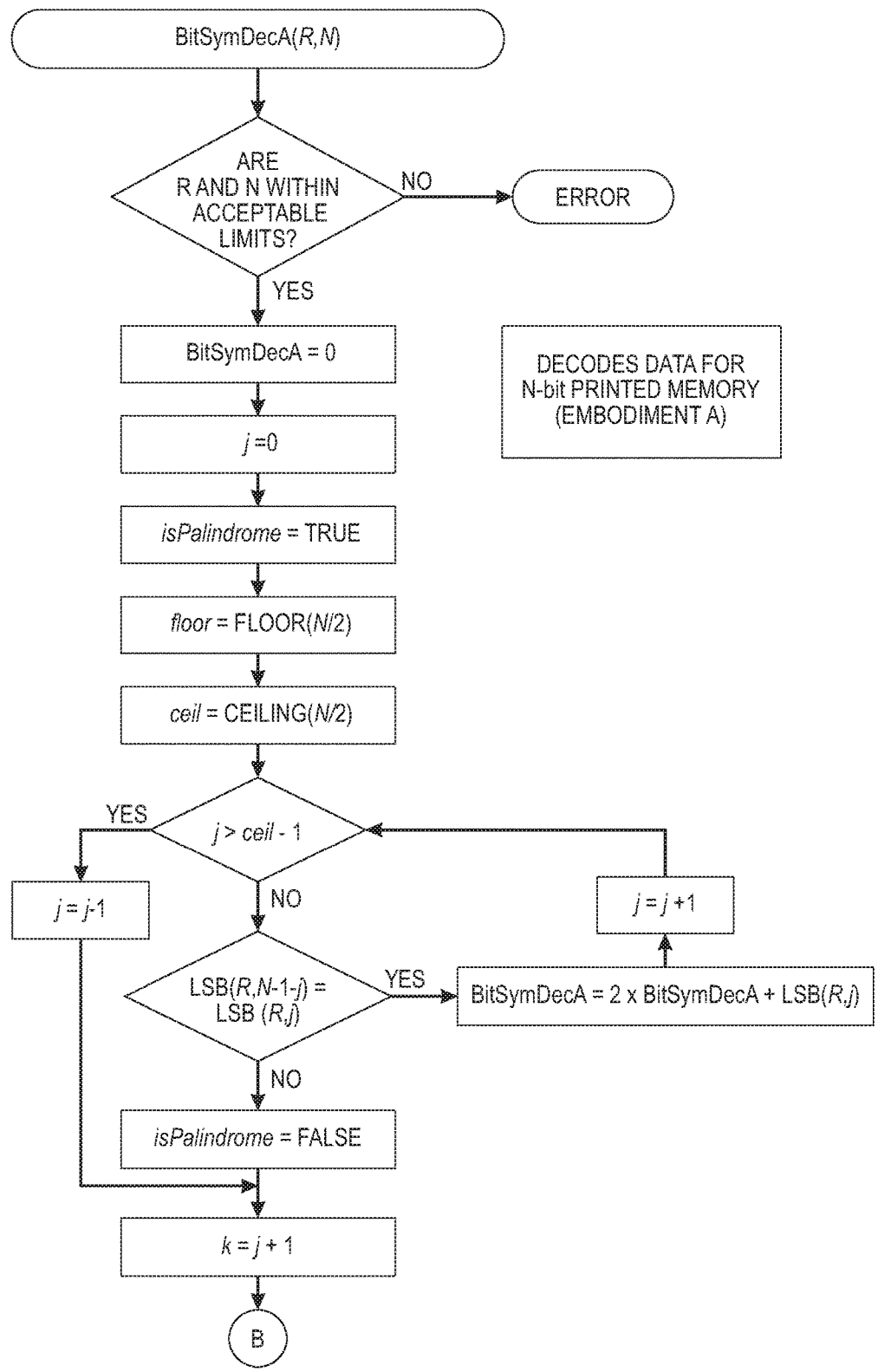
FIG. 12 is a first portion of a flowchart depicting an embodiment of an algorithm for decoding data for N-bit memory, e.g., N-bit printed memory.
Figure 13:
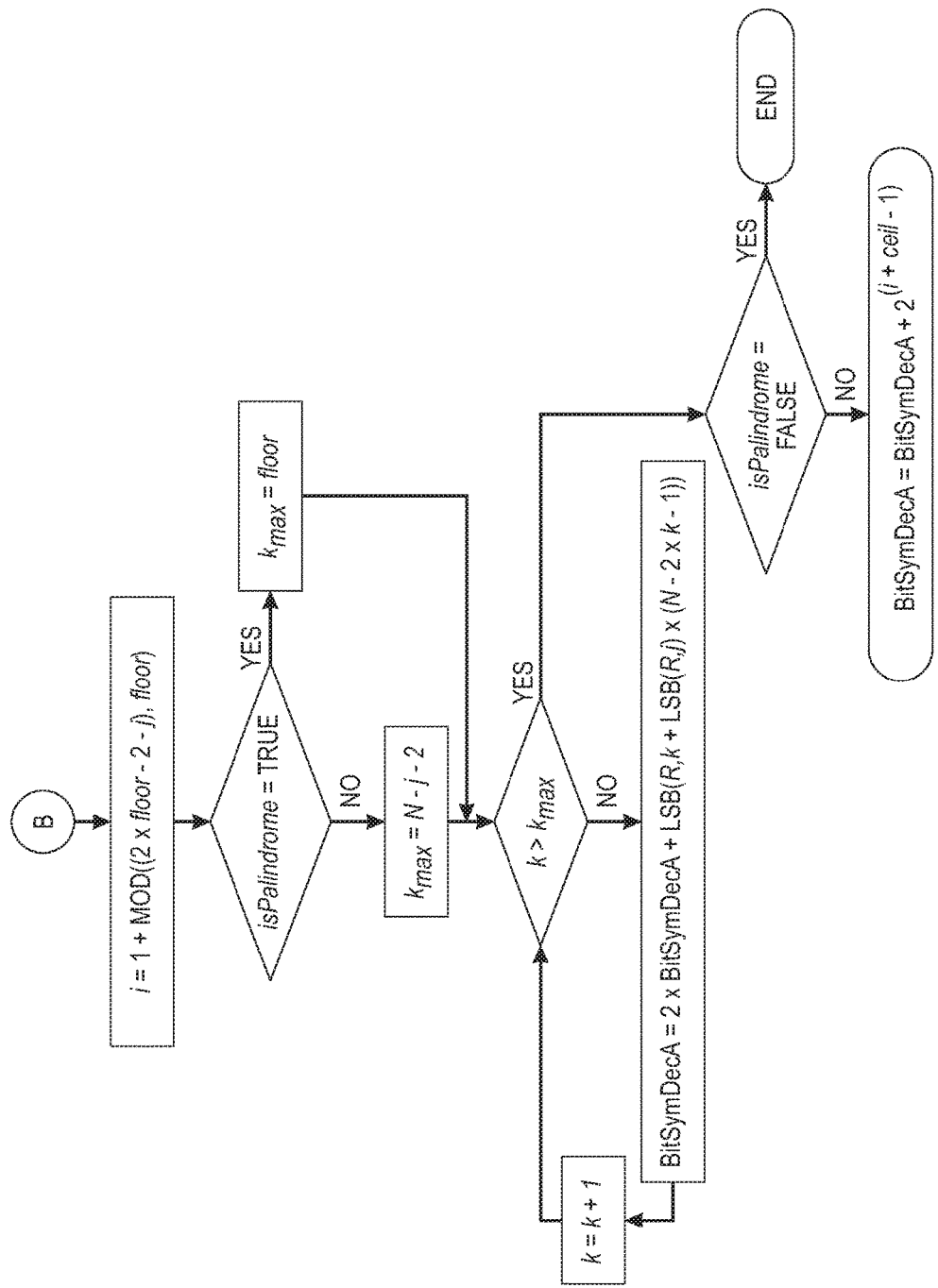
FIG. 13 is a second portion of a flowchart depicting the embodiment of the algorithm for decoding data for N-bit memory, e.g., N-bit printed memory, shown in FIG. 11.
Figure 14:
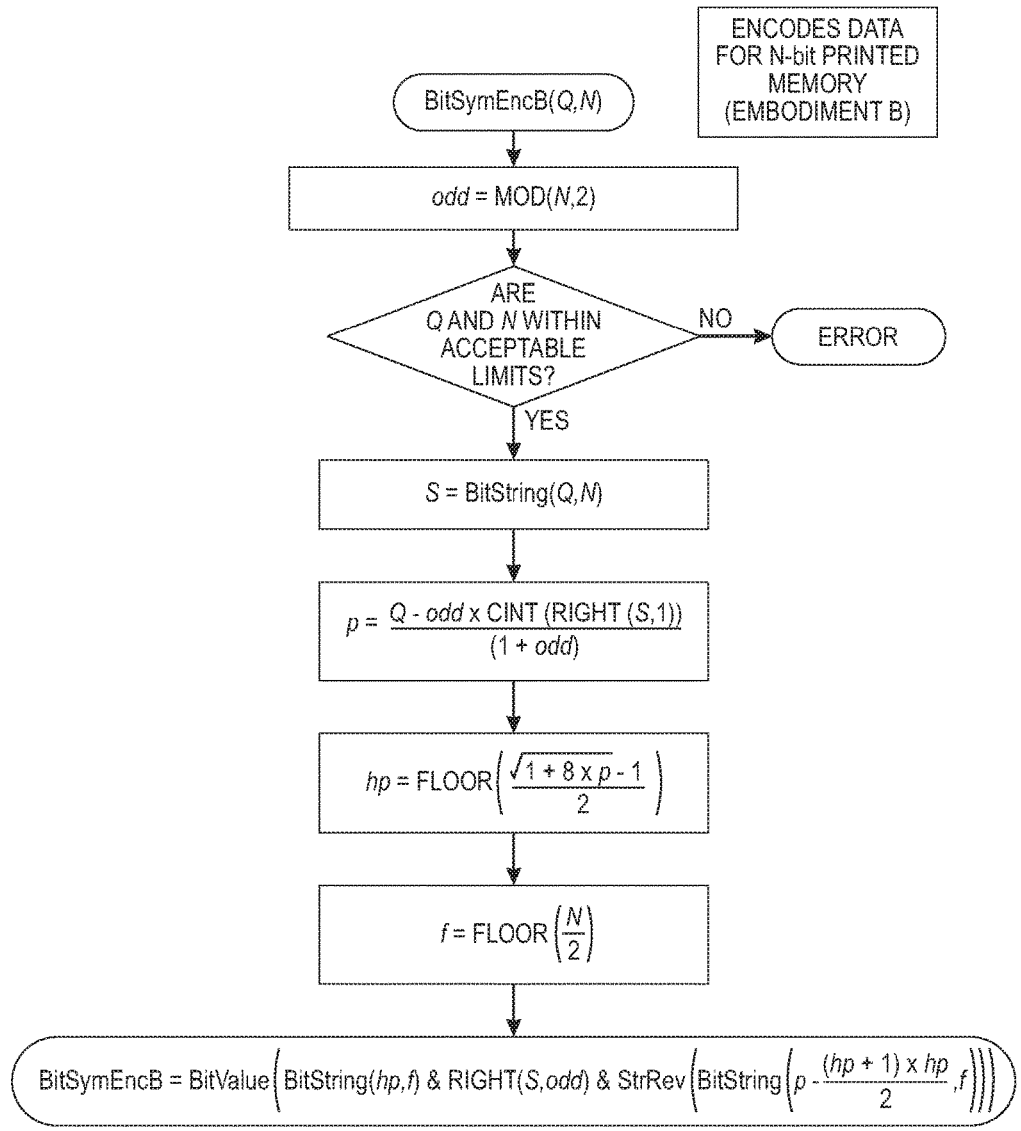
FIG. 14 is a flowchart depicting an embodiment of an algorithm for encoding data from N-bit memory, e.g., N-bit printed memory; and, FIG. 15 is a flowchart depicting an embodiment of an algorithm for decoding data for N-bit memory, e.g., N-bit printed memory.
Figure 15:
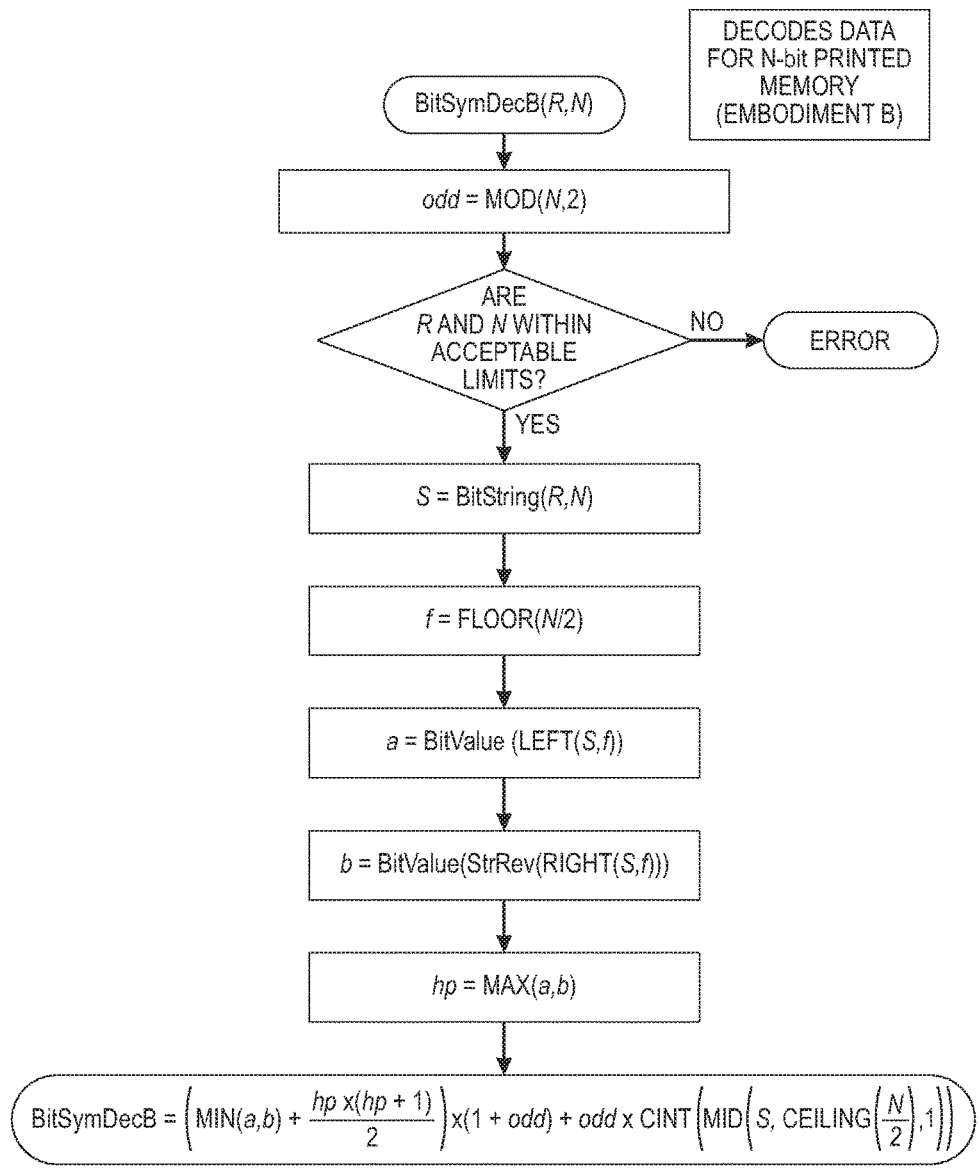

The present algorithms provide a method by which a single reader module, e.g., reader 24, may be used for multiple configurations of printed memory device, e.g., wallet cards 26 and 28. The PM will be written with the wallet card integrated into a display card, as shown in cards 26 and 28 in FIGS. 3 and 4. The PM may then be read in this configuration, or the wallet card may be punched out along a semi-perf before reading the PM. By using reversed orientations, the two card configurations may each be registered appropriately to align the PM label with contacts within reader 24.

It should be appreciated that the embodiments described herein may be implemented with a printed memory reader. Reader 24 may include a plurality of probes 30 arranged to contact a plurality of contact pads 22. Reader 24 may further include memory storage element 32 including instructions programmed to execute the steps of the various embodiments set forth herebelow. Printed memory reader 24 further comprises processor 34 arranged to execute the aforementioned instructions.

Notation

[A ... B) will represent the set $\{x \in \mathbb{Z} : A \leq x < B\}$ where $\mathbb{Z}$ is the set of integers. Specifically, [0 ... N) will represent the set of cardinality N representing the non-negative integers strictly less than N. If $B \leq A$, then [A ... B) is the empty set. The modulus function is defined such that $0 \leq x \pmod{b} < b$ and $x = k \cdot b + x \pmod{b}$ for some $k \in \mathbb{Z}$. The floor function is defined by $\lfloor x \rfloor \stackrel{\Delta}{=} x - x \pmod 1$. The ceiling function is similarly defined by $\lceil x \rceil \stackrel{\Delta}{=} -\lfloor -x \rfloor$. A mapping $f$ from set U to set V will be declared as $f : U \to V$. A composition of mappings $f : U \to V$ and $g : T \to U$ will be denoted $f * g : T \to V$. The inverse of $f$, if it exists, will of course be written as $f^{-1}$ with the identity mapping I, so that $f^{-1} * f = f * f^{-1} = I$. A binary number with N digits will be represented by $x_{(N)}$. The concatenation of two binary numbers is defined according to $x_{(N)} \circ y_{(M)} \stackrel{\Delta}{=} (x \cdot 2^M + y)_{(N+M)}$. The specific mapping r is defined as the bit-reversal mapping, which may be defined recursively by $(rx)_{(1)} \stackrel{\Delta}{=} x_{(1)}$ and $r(x_{(N)} \circ y_{(M)}) = ry_{(M)} \circ rx_{(N)}$. The triangular numbers $t_q$ are given by $$t_q = \frac{q(q+1)}{2}.$$

Problem Statement

For an N-bit label, the possible states are [0 ... $2^N$). Of these $2^N$ states, $$2^{\lceil \frac{N}{2} \rceil}$$

are palindromes, i.e., they are invariant under bit-reversal. That leaves $$2^N - 2^{\lceil \frac{N}{2} \rceil}$$

non-palindrome states. Each of these is indistinguishable from one other non-palindrome state with the same bits in reversed order. That means there are $$2^{N-1} - 2^{(\lceil \frac{N}{2} \rceil - 1)}$$

distinct non-palindrome states when the orientation of the label is not known. The total number of distinct states under this condition is then $$2^{N-1} - 2^{(\lceil \frac{N}{2} \rceil - 1)} + 2^{\lceil \frac{N}{2} \rceil} = 2^{N-1} + 2^{(\lceil \frac{N}{2} \rceil - 1)} = 2^{(\lceil \frac{N}{2} \rceil - 1)} \cdot \left(2^{\lfloor \frac{N}{2} \rfloor} + 1\right).$$

This means that we seek an encoding mapping $$f : \left[0 \ldots 2^{N-1} + 2^{(\lceil \frac{N}{2} \rceil - 1)}\right) \to [0 \ldots 2^N)$$

and a decoding mapping g:

$$[0 \ldots 2^N) \to \left[0 \ldots 2^{N-1} + 2^{(\lceil \frac{N}{2} \rceil - 1)}\right)$$

such that $g * f = g * r * f = I$. In practice, there are a large number of choices of $f$ and $$g \sim \left(2^{N-1} + 2^{(\lceil \frac{N}{2} \rceil - 1)}\right)! \cdot 2^{\left(2^{(N-1)} - 2^{(\lceil \frac{N}{2} \rceil - 1)}\right)}$$

to be exact, although we will consider functions $f_1$ and $f_2$ to be equivalent when $$\forall x \in \left[0 \ldots 2^{N-1} + 2^{(\lceil \frac{N}{2} \rceil - 1)}\right)(f_1 x = f_2 x \lor f_1 x = r f_2 x).$$

This reduces the space of mapping functions to $$\left(2^{N-1} + 2^{(\lceil \frac{N}{2} \rceil - 1)}\right)!$$

choices of $f$ and allows us to consider g to be the inverse of $f$. We will describe two embodiments in particular which are readily characterized in terms of N, then extend them to more general embodiments.

Embodiment A

The embodiment presented herebelow builds on one of the alternative strategies presented infra, i.e., Strategy 2. First, Strategy 2 is examined with the notation set forth above:

| Data | Number of data states | Encoded | Reversed | Number of code states |
|---|---|---|---|---|
| $x_{(N-2)}$ | $2^{(N-2)}$ | $0_{(1)} \circ x_{(N-2)} \circ 1_{(1)}$ | $1_{(1)} \circ rx_{(N-2)} \circ 0_{(1)}$ | $2^{(N-1)}$ |

Clearly, half of the $2^N$ available code states are not being used, so Strategy 2 is inefficient. Specifically, the $0_{(1)} \circ x_{(N-2)} \circ 0_{(1)}$ and $1_{(1)} \circ x_{(N-2)} \circ 1_{(1)}$) code states do not code for any data state under this scheme. As a result, only $2^{(N-2)}$ of the theoretical $$2^{N-1} + 2^{(\lceil \frac{N}{2} \rceil - 1)}$$

distinguishable data states can be encoded, i.e., a waste of slightly more than one bit.

Embodiment A is similar to Strategy 2, but partitions the available data and code spaces to use all the available code states. To introduce Embodiment A, the solution will be presented first for even N and then for odd N. For N even:

| Data | Number of data states | Encoded | Reversed | Number of code states |
|---|---|---|---|---|
| $(01)_{(2)} \circ y_{(N-2)}$ | $2^{(N-2)}$ | $0_{(1)} \circ y_{(N-2)} \circ 1_{(1)}$ | $1_{(1)} \circ ry_{(N-2)} \circ 0_{(1)}$ | $2^{(N-1)}$ |
| $(001)_{(3)} \circ x_{(1)} \circ y_{(N-4)}$ | $2^{(N-3)}$ | $x_{(1)} \circ 0_{(1)} \circ y_{(N-4)} \circ 1_{(1)} \circ rx_{(1)}$ | $x_{(1)} \circ 1_{(1)} \circ ry_{(N-4)} \circ 0_{(1)} \circ rx_{(1)}$ | $2^{(N-2)}$ |
| . | . | . | . | . |
| $(0\ldots 01)_{(N/2)} \circ x_{(N/2-2)} \circ y_{(2)}$ | $2^{(N/2)}$ | $x_{(N/2-2)} \circ 0_{(1)} \circ y_{(2)} \circ 1_{(1)} \circ rx_{(N/2-2)}$ | $x_{(N/2-2)} \circ 1_{(1)} \circ ry_{(2)} \circ 0_{(1)} \circ rx_{(N/2-2)}$ | $2^{(N/2+1)}$ |
| $(10\ldots 0)_{(N/2+1)} \circ x_{(N/2-1)}$ | $2^{(N/2-1)}$ | $x_{(N/2-1)} \circ 0_{(1)} \circ 1_{(1)} \circ rx_{(N/2-1)}$ | $x_{(N/2-1)} \circ 1_{(1)} \circ 0_{(1)} \circ rx_{(N/2-1)}$ | $2^{(N/2)}$ |
| $(0\ldots 0)_{(N/2)} \circ x_{(N/2)}$ | $2^{(N/2)}$ | $x_{(N/2)} \circ rx_{(N/2)}$ | $x_{(N/2)} \circ rx_{(N/2)}$ | $2^{(N/2)}$ |

For N Odd:

| Data | Number of data states | Encoded | Reversed | Number of code states |
|---|---|---|---|---|
| $(01)_{(2)} \circ y_{(N-2)}$ | $2^{(N-2)}$ | $0_{(1)} \circ y_{(N-2)} \circ 1_{(1)}$ | $1_{(1)} \circ ry_{(N-2)} \circ 0_{(1)}$ | $2^{(N-1)}$ |
| $(001)_{(3)} \circ x_{(1)} \circ y_{(N-4)}$ | $2^{(N-3)}$ | $x_{(1)} \circ 0_{(1)} \circ y_{(N-4)} \circ 1_{(1)} \circ rx_{(1)}$ | $x_{(1)} \circ 1_{(1)} \circ ry_{(N-4)} \circ 0_{(1)} \circ rx_{(1)}$ | $2^{(N-2)}$ |
| . | . | . | . | . |
| $(0\ldots 01)_{(\lfloor N/2 \rfloor)} \circ x_{(\lfloor N/2 \rfloor -2)} \circ y_{(3)}$ | $2^{\lfloor N/2 \rfloor}$ | $x_{(\lfloor N/2 \rfloor -2)} \circ 0_{(1)} \circ y_{(3)} \circ 1_{(1)} \circ rx_{(\lfloor N/2 \rfloor -2)}$ | $x_{(\lfloor N/2 \rfloor -2)} \circ 1_{(1)} \circ ry_{(3)} \circ 0_{(1)} \circ rx_{(\lfloor N/2 \rfloor -2)}$ | $2^{(\lfloor N/2 \rfloor +1)}$ |
| $(10\ldots 0)_{(\lfloor N/2 \rfloor)} \circ x_{(\lfloor N/2 \rfloor -1)} \circ y_{(1)}$ | $2^{\lfloor N/2 \rfloor}$ | $x_{(\lfloor N/2 \rfloor -1)} \circ 0_{(1)} \circ y_{(1)} \circ 1_{(1)} \circ rx_{(\lfloor N/2 \rfloor -1)}$ | $x_{(\lfloor N/2 \rfloor -1)} \circ 1_{(1)} \circ ry_{(1)} \circ 0_{(1)} \circ rx_{(\lfloor N/2 \rfloor -1)}$ | $2^{\lfloor N/2 \rfloor}$ |
| $(0\ldots 0)_{(\lfloor N/2 \rfloor)} \circ x_{(\lfloor N/2 \rfloor)} \circ y_{(1)}$ | $2^{\lfloor N/2 \rfloor}$ | $x_{(\lfloor N/2 \rfloor)} \circ y_{(1)} \circ rx_{(\lfloor N/2 \rfloor)}$ | $x_{(\lfloor N/2 \rfloor)} \circ ry_{(1)} \circ rx_{(\lfloor N/2 \rfloor)}$ | $2^{\lfloor N/2 \rfloor}$ |

For General $N \in \mathbb{N}$ and $j \in [0 \ldots \lfloor N/2 \rfloor]$:

| Data | Number of data states | Encoded | Reversed | Number of code states |
|---|---|---|---|---|
| $(10\ldots 0)_{(\lfloor N/2 \rfloor)} \circ x_{(\lfloor N/2 \rfloor -1)} \circ y_{(1)}$ | $2^{\lfloor N/2 \rfloor}$ | $x_{(\lfloor N/2 \rfloor -1)} \circ 0_{(1)} \circ y_{(1)} \circ 1_{(1)} \circ rx_{(\lfloor N/2 \rfloor -1)}$ | $x_{(\lfloor N/2 \rfloor -1)} \circ 1_{(1)} \circ ry_{(1)} \circ 0_{(1)} \circ rx_{(\lfloor N/2 \rfloor -1)}$ | $2^{\lfloor N/2 \rfloor}$ |
| $(0\ldots 0)_{(\lfloor N/2 \rfloor)} \circ x_{(\lfloor N/2 \rfloor)} \circ y_{(1)}$ | $2^{\lfloor N/2 \rfloor}$ | $x_{(\lfloor N/2 \rfloor)} \circ y_{(1)} \circ rx_{(\lfloor N/2 \rfloor)}$ | $x_{(\lfloor N/2 \rfloor)} \circ ry_{(1)} \circ rx_{(\lfloor N/2 \rfloor)}$ | $2^{\lfloor N/2 \rfloor}$ |
| $(0\ldots 0)_{(j+2)} \circ x_{(j)} \circ y_{(N-2j-2)}$ | $2^{(N-1)} - 2^{\lfloor N/2 \rfloor} - 2^{(\lfloor N/2 \rfloor -1)}$ | $x_{(j)} \circ 0_{(1)} \circ y_{(N-2j-2)} \circ 1_{(1)} \circ rx_{(j)}$ | $x_{(j)} \circ 1_{(1)} \circ ry_{(N-2j-2)} \circ 0_{(1)} \circ rx_{(j)}$ | $2^N - 2^{\lfloor N/2 \rfloor} - 2^{(\lfloor N/2 \rfloor +1)}$ |

Using this general form, it is straightforward to describe an encoding mapping $f$ and decoding mapping $g$ in an algorithm. Proof of the desired quality $g*f = g*r*f = I$ is readily apparent to one having ordinary skill in the art upon inspection.

Example 1—Embodiment A—Encode—Between $2^5$ and $2^9$

| | |
|---|---|
| Data payload is constructed | 0001101011 |
| Count leading zeros (3) | 0001101011 |
| For 3 leading zero, place 0 and 1 in the $3^{rd}$ position from the end | ___0___1___ |
| Drop leading zeros and the first 1 from the data payload | 0001101011 |
| Note the next 3 − 1 = 2 digits | 0001101011 |
| Place the digits at the beginning and their reverse at the end | 100___101 |
| Place the remaining digits in the middle | 1001011101 |
| Return encoded value | 1001011101 |

Example 1—Embodiment A—Decode—Mismatch Before the Middle

| | Original order | Reversed |
|---|---|---|
| Read encoded value | 1001011101 | 1011101001 |
| Compare first and last digits | 1001011101 | 1011101001 |
| Continue inward until a mismatch is found | 1001011101 | 1011101001 |
| If the mismatch reads . . . 1 . . . 0 . . . , reverse the number | 1001011101 | 1001011101 |
| Note the digits between the mismatch | 1001011101 | 1001011101 |
| Place the digits between the mismatch at the end | _____1011 | _____1011 |
| Note the digits before the 0 | 1001011101 | 1001011101 |
| Place these digits before the filled digits | _____101011 | _____101011 |
| Place a 1 before the filled digits | _____1101011 | _____1101011 |
| Fill in with zeros | 0001101011 | 0001101011 |
| Return decoded value | 0001101011 | 0001101011 |

Example 2—Embodiment A—Encode—Less than $2^5$

| | |
|---|---|
| Data payload is constructed | 0000010111 |
| Count leading zeros (5) | 0000010111 |
| For 5 leading zeros, note the remaining digits | 0000010111 |
| Place the remaining digits at the beginning | 10111_____ |
| Place the same digits in reverse order | 1011111101 |
| Return encoded value | 1011111101 |

Example 2—Embodiment A—Decode—No Mismatch (Palindrome)

| | Original order | Reversed |
|---|---|---|
| Read encoded value | 1011111101 | 1011111101 |
| Compare first and last digits | 1011111101 | 1011111101 |
| Continue inward until no match is found | 1011111101 | 1011111101 |
| Note the first half of the number | 1011111101 | 1011111101 |
| Place these digits at the end | _ _ _ _ _ 10111 | _ _ _ _ _ 10111 |
| Fill in with zeros | 0000010111 | 0000010111 |
| Return decoded value | 0000010111 | 0000010111 |

Example 3—Embodiment A—Encode—More than $2^9$

| | |
|---|---|
| Data payload is constructed | 1000000011 |
| Count leading zeros (0) | 1000000011 |
| For 0 leading zeros, place 0 and 1 in positions flanking the middle | _ _ _ _ 01 _ _ _ _ |
| Note the last 4 digits and drop the rest | 1000000011 |
| Place the digits at the beginning and their reverse at the end | 0011011100 |
| Return encoded value | 0011011100 |

Example 3—Embodiment A—Decode—Mismatch in the Middle

| | Original order | Reversed |
|---|---|---|
| Read encoded value | 0011011100 | 0011101100 |
| Compare first and last digits | 0011011100 | 0011011100 |
| Continue inward until a mismatch is found | 0011011100 | 0011101100 |
| If the mismatch reads . . . 1 . . . 0 . . . , reverse the number | 0011011100 | 0011011100 |
| Note the digits before the mismatch | 0011011100 | 0011011100 |
| Place the digits before the mismatch at the end | _ _ _ _ _ _ 0011 | _ _ _ _ _ _ 0011 |
| Place a 1 at the beginning | 1 _ _ _ _ _ 0011 | 1 _ _ _ _ _ 0011 |
| Fill in with zeros | 1000000011 | 1000000011 |
| Return decoded value | 1000000011 | 1000000011 |

Generalizations of Embodiment A

This embodiment suggests a number of other solutions that may be obtained via simple transformations relative to the proposed solution, including any combination of the following:

- Any symmetric reordering of the encoded state, i.e., any composition of the invertible mappings $s_j$, where $j \in [0 \ldots \lfloor N/2 \rfloor]$ and $s_j(x_{(j)} \circ y_{(N-2j)} \circ z_{(j)}) \stackrel{\Delta}{=} x_j \circ ry_{(N-2j)} \circ z_{(j)}$
- Any symmetric bit-flipping operation, i.e., bitwise XOR between the encoded state and any N-bit palindrome
- Swapping the interpretation of data states beginning with $(0 \ldots 01)_{(\lfloor N/2 \rfloor)}$ and $(0 \ldots 00)_{(\lfloor N/2 \rfloor)}$, i.e., to make the former map to palindromes and the latter to non-palindromes, rather than vice versa
- Replacing y with ry and/or x with rx in some subset of the rows of the general solution table, including any subset of values of j.

It is believed that such transformations may be useful for mild encryption, i.e., to make the coding specific to a particular application, device, or user. The above transformations generate $2^{(2N)}$ related mappings. Trivially, the encoded state may be reversed for some subset of the possible data states or at random, but given the context these should not be considered to produce distinct mappings.

Implementation of Embodiment A

As described above, the foregoing basic algorithm has been implemented as a pair of Excel® functions in VBA, together with a small set of more general functions for handling binary numbers.

| Format | Function |
|---|---|
| =BitSymEncA(Data, N) | Apply f to encode data |
| =BitSymDecA(Reading, N) | Apply g to decode data |
| =BitString(Data, N) | Convert numeric data to a string of "1"s and "0"s |
| =BitValue(Data) | Convert a string of "1"s and "0"s to numeric data |
| =StrRev(Reading, N) | Apply r to reverse a string of "1"s and "0"s |
| =LSB(Reading, j) | Return the 0-indexed $j^{th}$-least-significant bit |

Embodiment B

Embodiment B hinges on an explicit enumeration of all N-bit encoded states $x_{(N)}$ with the property $x_{(N)} \geq rx_{(N)}$. With $$h: \left[0 \ldots 2^{(\lceil N/2 \rceil - 1)} \cdot \left(2^{\lfloor N/2 \rfloor} + 1\right)\right) \to \left[0 \ldots 2^{\lfloor N/2 \rfloor}\right)$$

defined by $$hp = \left\lfloor \frac{-1 + \sqrt{1 + 8p}}{2} \right\rfloor,$$

note that $$t_{hp} \leq p < t_{hp+1} = t_{hp} + hp + 1$$

and $$hp < 2^{\lfloor N/2 \rfloor} \leftrightarrow 2^{(\lceil N/2 \rceil - 1)} \cdot \left(2^{\lfloor N/2 \rfloor} + 1\right).$$

| Data | Number of data states | Encoded | Reversed | Number of code states |
|---|---|---|---|---|
| $p_{(2\lfloor N/2 \rfloor)}$ $y_{(\lceil N/2 \rceil - \lfloor N/2 \rfloor)}$ | $2^{(\lceil N/2 \rceil - 1)} \cdot (2^{\lfloor N/2 \rfloor} + 1)$ | $hp_{(\lfloor N/2 \rfloor)}$ $y_{(\lceil N/2 \rceil - \lfloor N/2 \rfloor)}$ $r(p - t_{hp})_{(\lfloor N/2 \rfloor)}$ | $(p - t_{hp})_{(\lfloor N/2 \rfloor)}$ $y_{(\lceil N/2 \rceil - \lfloor N/2 \rfloor)}$ $rhp_{(\lfloor N/2 \rfloor)}$ | $2^N$ |

With this formulation, it is noted that the encoded value is never smaller than its inverse, and palindromes occur precisely when p is one less than a triangular number, i.e., $p = t_{hp} + hp$. The strategy behind Embodiment B becomes clearer when grouped by values of hp, as tabulated on the following tables. Here k is used for hp+1.

Solution Embodiment B

| Data | Number of data states | Encoded | Reversed | Number of code states |
|---|---|---|---|---|
| $(0\ldots 0)_{(2\lfloor N/2\rfloor)}$ $y_{(\lceil N/2\rceil - \lfloor N/2\rfloor)}$ | $2^{(\lceil N/2\rceil - \lfloor N/2\rfloor)} \cdot 1$ | $(0\ldots 0)_{(\lfloor N/2\rfloor)}$ $y_{(\lceil N/2\rceil - \lfloor N/2\rfloor)}$ $(0\ldots 0)_{(\lfloor N/2\rfloor)}$ | $(0\ldots 0)_{(\lfloor N/2\rfloor)}$ $y_{(\lceil N/2\rceil - \lfloor N/2\rfloor)}$ $(0\ldots 0)_{(\lfloor N/2\rfloor)}$ | $2^{(\lceil N/2\rceil - \lfloor N/2\rfloor)} \cdot 1$ |
| $[1\ldots 3]_{(2\lfloor N/2\rfloor)}$ $y_{(\lceil N/2\rceil - \lfloor N/2\rfloor)}$ | $2^{(\lceil N/2\rceil - \lfloor N/2\rfloor)} \cdot 2$ | $(0\ldots 01)_{(\lfloor N/2\rfloor)}$ $y_{(\lceil N/2\rceil - \lfloor N/2\rfloor)}$ $r[0\ldots 2]_{(\lfloor N/2\rfloor)}$ | $[0\ldots 2]_{(\lfloor N/2\rfloor)}$ $y_{(\lceil N/2\rceil - \lfloor N/2\rfloor)}$ $(10\ldots 0)_{(\lfloor N/2\rfloor)}$ | $2^{(\lceil N/2\rceil - \lfloor N/2\rfloor)} \cdot 2$ |
| . | . | . | . | . |
| $[t_{k-1}\ldots t_k]_{(2\lfloor N/2\rfloor)}$ $y_{(\lceil N/2\rceil - \lfloor N/2\rfloor)}$ | $2^{(\lceil N/2\rceil - \lfloor N/2\rfloor)} \cdot k$ | $(k-1)_{(\lfloor N/2\rfloor)}$ $y_{(\lceil N/2\rceil - \lfloor N/2\rfloor)}$ $r[0\ldots k]_{(\lfloor N/2\rfloor)}$ | $[0\ldots k]_{(\lfloor N/2\rfloor)}$ $y_{(\lceil N/2\rceil - \lfloor N/2\rfloor)}$ $r(k-1)_{(\lfloor N/2\rfloor)}$ | $2^{(\lceil N/2\rceil - \lfloor N/2\rfloor)} \cdot k$ |
| . | . | . | . | . |
| $[t_2^{\lfloor N/2\rfloor}{-1}\ldots t_2^{\lfloor N/2\rfloor}]_{(2\lfloor N/2\rfloor)}$ $y_{(\lceil N/2\rceil - \lfloor N/2\rfloor)}$ | $2^{(\lceil N/2\rceil)}$ | $(1\ldots 1)_{(\lfloor N/2\rfloor)}$ $y_{(\lceil N/2\rceil - \lfloor N/2\rfloor)}$ $r[0\ldots 2)^{(\lfloor N/2\rfloor)})_{(\lfloor N/2\rfloor)}$ | $[0\ldots 2)^{\lfloor N/2\rfloor}{}_{(\lfloor N/2\rfloor)}$ $y_{(\lceil N/2\rceil - \lfloor N/2\rfloor)}$ $(1\ldots 1)_{(\lfloor N/2\rfloor)}$ | $2^{(\lceil N/2\rceil)}$ |

Example 1—Embodiment B—Encode—Even N

| | |
|---|---|
| Data payload is constructed | 0110101111 |
| Use entire value for p | p = 431 |
| Calculate hp | $hp = \left\lfloor \dfrac{-1 + \sqrt{1 + 8 \cdot 431}}{2} \right\rfloor = 28$ |
| Calculate $p - t_{hp}$ | $p - t_{hp} = 431 - \dfrac{28 * 29}{2} = 25$ |
| Express hp in binary and place at the beginning | 11100 _ _ _ _ _ |
| Express $p - t_{hp}$ in binary and fill in in reverse | 1110010011 |
| Return encoded value | 1110010011 |

Example 1—Embodiment B—Decode—Even N

| | Original order | Reversed |
|---|---|---|
| Read encoded value | 1110010011 | 1100100111 |
| Compare to reverse | 1100100111 | 1110010011 |
| Select the larger | s = 1110010011 | s = 1110010011 |
| Note the first 5 digits | 1110010011 | 1110010011 |
| Use these digits as hp | hp = 28 | hp = 28 |
| Note the last 5 digits | 1110010011 | 1110010011 |
| Reverse these digits and evaluate | 25 | 25 |
| Calculate $t_{hp}$ | $t_{28} = 406$ | $t_{28} = 406$ |
| Add these two values | 25 + 406 = 431 | 25 + 406 = 431 |
| Return decoded value | 0110101111 | 0110101111 |

Example 2—Embodiment B—Encode—Odd N

| | |
|---|---|
| Data payload is constructed | 000101110 |
| Use LSB for y | 000101110 → y = 0 |
| Use remaining bits for p | 000101110 → p = 23 |
| Calculate hp | $hp = \left\lfloor \dfrac{-1 + \sqrt{1 + 8 \cdot 23}}{2} \right\rfloor = 6$ |
| Calculate $p - t_{hp}$ | $p - t_{hp} = 23 - \dfrac{6 * 7}{2} = 2$ |

-continued

| | |
|---|---|
| Express hp in binary and place at the beginning | 0110 _ _ _ _ _ |
| Place y in the middle | 01100 _ _ _ _ |
| Express $p - t_{hp}$ in binary and fill in in reverse | 011000100 |
| Return encoded value | 011000100 |

Example 2—Embodiment B—Decode—Odd N

| | Original order | Reversed |
|---|---|---|
| Read encoded value | 011000100 | 001000110 |
| Compare to reverse | 001000110 | 011000100 |
| Select the larger | s = 011000100 | s = 011000100 |
| Note the first 4 digits | 011000100 | 011000100 |
| Use these digits as hp | hp = 6 | hp = 6 |
| Note the middle digit | 011000100 | 011000100 |
| Use this digit as y | y = 0 | y = 0 |
| Note the last 4 digits | 011000100 | 011000100 |
| Reverse these digits and evaluate | 2 | 2 |
| Calculate $t_{hp}$ | $t_6 = 21$ | $t_6 = 21$ |
| Add y to twice the sum of these two values | 0 + 2(2 + 21) = 46 | 0 + 2(2 + 21) = 46 |
| Return decoded value | 000101110 | 000101110 |

Example 3—Embodiment B—Encode—Palindrome

| | |
|---|---|
| Data payload is constructed | 0101111001 |
| Use entire value for p | p = 377 |
| Calculate hp | $hp = \left\lfloor \dfrac{-1 + \sqrt{1 + 8 \cdot 377}}{2} \right\rfloor = 26$ |
| Calculate $p - t_{hp}$ | $p - t_{hp} = 377 - \dfrac{26 * 27}{2} = 26$ |
| Express hp in binary and place at the beginning | 11010 _ _ _ _ _ |
| Express $p - t_{hp}$ in binary and fill in in reverse | 1101001011 |
| Return encoded value | 1101001011 |

Example 3—Embodiment B—Decode—Palindrome

|  | Original order | Reversed |
| --- | --- | --- |
| Read encoded value | 1101001011 | 1101001011 |
| Compare to reverse | 0011101100 | 0011101100 |
| Select the larger | s = 1101001011 | s = 1110010011 |
| Note the first 5 digits | 1101001011 | 1110010011 |
| Use these digits as hp | hp = 26 | hp = 26 |
| Note the last 5 digits | 1101001011 | 1101001011 |
| Reverse these digits and evaluate | 26 | 26 |
| Calculate $t_{hp}$ | $t_{26}$ = 351 | $t_{26}$ = 351 |
| Add these two values | 26 + 351 = 377 | 26 + 351 = 377 |
| Return decoded values | 0101111001 | 0101111001 |

Generalizations of Embodiment B

While symmetric reorderings and symmetric bitwise-XOR transforms can generate a family of solutions from Embodiment B, any permutation transform will allow computation of the full generality of possible mappings. If $$z: \left[0 \ldots 2^{N-1} + 2^{(\lceil \frac{N}{2} \rceil - 1)}\right) \rightarrow \left[0 \ldots 2^{N-1} + 2^{(\lceil \frac{N}{2} \rceil - 1)}\right)$$

is a permutation of states (any invertible z qualifies), then transforming the payload data by z will generate another valid mapping from Embodiment A or B. For every valid mapping $f$ there is a permutation that converts Embodiment A to $f$ and another that converts Embodiment B to $f$. Permutations may be generated from a deterministic function, a random bitstream, or a key file by known methods. For N bits there are $$\left(2^{N-1} + 2^{(\lceil \frac{N}{2} \rceil - 1)}\right)!$$

permutations, any one of which may be characterized by $$\log_2\left(2^{(N-1)} + 2^{(\lceil \frac{N}{2} \rceil - 1)}\right)!$$

bits. By Stirling's approximation, this file size is $O(N2^N)$. For 20 bits this is a file of just over 1 MB. For larger bit strings, a deterministic function may be more appropriate.

Symmetric reorderings, symmetric bitwise-XOR transforms, and combinations thereof constitute some examples of deterministic functions that may be used to generate permutation transforms.

Implementation of Embodiment B

As in Embodiment A, Embodiment B can be implemented via Excel® formulas as generally follows:

| Constants: | f = FLOOR( N/2, 1 ) |
| --- | --- |
|  | c = CEILING( N/2, 1 ) |
|  | odd = MOD( N, 2 ) = 1 |
| To encode: | p = FLOOR( data/IF( odd, 2, 1 ), 1 ) |
|  | y = ""&IF( odd, MOD( data, 2 ), "" ) |
|  | hp = FLOOR( ( SQRT( 1+8*p ) − 1 )/2, 1 ) |
|  | encoded = BitValue( BitString( hp, |
|  | f )&y&StrRev(BitString( p−(hp+1)*hp/2, f ))) |
| To decode: | s = BitString(MAX( reading, |
|  | BitValue( StrRev( BitString( reading, N ) ) ) ), N ) |
|  | y = IF( odd, VALUE( MID( s, c, 1 )), 0 ) |
|  | hp = BitValue( LEFT( s, f ) ) |
|  | p = BitValue( LEFT( StrRev( s ), f ) + hp*(hp+1)/2 |
|  | decoded = y + p*IF( odd, 2, 1 ) |

As described above, the foregoing basic algorithm has been implemented as a pair of Excel® functions in VBA, together with a small set of more general functions for handling binary numbers.

| Format | Function |
| --- | --- |
| =BitSymEncB(Data, N) | Apply f to encode data |
| =BitSymDecB(Reading, N) | Apply g to decode data |
| =BitString(Data, N) | Convert numeric data to a string of "1"s and "0"s |
| =BitValue(Data) | Convert a string of "1"s and "0"s to numeric data |
| =StrRev(Reading, N) | Apply r to reverse a string of "1"s and "0"s |

Table 1 below includes a listing of Visual Basic functions used in various embodiments of algorithms and software code arranged to perform the present methods. It should be appreciated the functions below include the operators relevant to the various disclosed embodiments; however, other operators conventionally associated with these functions may also be used.

TABLE 1

| FUNCTION ( operators ) | Description |
| --- | --- |
| CEILING ( number ) | returns the smallest integer greater than or equal to number |
| CINT ( expression ) | converts expression to an integer value |
| FLOOR ( number ) | returns the largest integer less than or equal to number |
| INT ( number ) | returns integer portion of a number; for negative number, returns first negative integer less than or equal to number |
| LEFT ( text, [number_of_characters] ) | extracts a sub string from text starting from the left most character of a length number_of_characters |
| LEN ( text ) | returns length of text |
| LOG ( number, [base] ) | returns logarithm of number to a specified base (if base omitted, base is 10) |
| MAX ( number1, [number2, . . . number_n] ) | returns the largest value from the numbers provided, i.e., number1, . . . number_n |

TABLE 1-continued

| FUNCTION ( operators ) | Description |
|---|---|
| MID ( text, start_position, number_of_characters) | extracts a substring from text beginning at start_position (left most position is 1) of a length number of characters |
| MIN ( number1, [number2, . . . number_n] ) | returns the smallest value from the numbers provided, i.e., number1, . . . number_n |
| MOD ( number, divisor ) or number MOD divisor | returns remainder after number is divided by divisor |
| RIGHT ( text, [number_of_characters] ) | extracts a sub string from text starting from the right most character of a length number of characters |
| SQR ( number ) | returns square root of number |
| string1 & string2 | concatenate string1 with string2 |

The following section include a full Visual Basic listing of embodiments of algorithms and software code that are arranged to perform steps as described in the accompanying flowcharts. Functions LSB, StrRev, BitString, BitValue, BitSymEnc (embodiments A and B), and BitSymDec (embodiments A and B) are included below.

LSB (Least Significant Bit—Returns the 0-Indexed $j^{th}$ Least Significant Bit) Function:

```
Function LSB(reading, j As Integer) As Integer
    Dim R As Double: R = CDbl(reading)
    If (R < 0) Or (j < 0) Then
        LSB = CVErr(xlErrValue)
    Else
        LSB = Fix(R / 2 ^ j) - 2 * Fix(R / 2 A (j + 1))
    End If
End Function
```

StrRev (String Reverse—Returns the String in Reverse Format) Function:

```
Function StrRev(S As String) As String
    Dim i As Integer
    StrRev = ""
    For i = 1 To Len(S)
        StrRev = Mid(S, i, 1) & StrRev
    Next i
End Function
```

BitString (Bit Number to String—Converts Numeric Data to a String of "1"s and "0"s) Function:

```
Function BitString(reading, N As Integer) As String
    Dim R As Double
    R = CDbl(reading)
    ' Excel cell value resolution allows for 15 decimal digits
    ' This is equivalent to 49 binary digits
    ' N should therefore be 1 to 49
    ' and R should be 0 to 2^N - 1
    If (N < 1) Or (N > 49) Then
        BitString = CVErr(xlErrValue)
    ElseIf (R < 0) Or (R >= 2 ^ N) Then
        BitString = CVErr(xlErrValue)
    End If
    BitString = ""
    Dim j As Integer
    For j = 0 To (N - 1)
        BitString = LSB(R, j) & BitString
    Next j
End Function
```

BitValue (String to Number—Converts a String of "1"s and "0"s to Numeric Data) Function:

```
Function BitValue(S As String) As Double
    Dim i As Integer
    BitValue = 0
    For i = 1 To Len(S)
        Select Case Mid(S, i, 1)
            Case "0"
                BitValue = 2 * BitValue
            Case "1"
                BitValue = 2 * BitValue + 1
            Case Else
                BitValue = CVErr(xlErrValue)
                Exit For
        End Select
    Next i
End Function
```

BitSymEncA (Encodes Data for N-Bit Printed Memory—Embodiment A) Function:

```
Function BitSymEncA(value, N As Integer) As Double
    Dim Q As Double: Q = CDbl(value)
    Dim floor As Integer: floor = Int(N / 2)
    Dim ceil As Integer: ceil = -Int(-N / 2)
    If (N < 1) Or (N > 49) Then
        BitSymEncA = CVErr(xlErrValue)
    ElseIf (Q < 0) Or (Q >= 2 ^ (ceil - 1) * (2 ^ floor + 1)) Then
        BitSymEncA = CVErr(xlErrValue)
    End If
    Dim S As String: S = BitString(Q, N)
    Dim x As String
    Dim y As String
    Dim d As Double
    If Q = 0 Then
        d = 0
    Else
        d = Log(Q) / Log(2)
    End If
    Select Case d
        Case Is >= N - 1
            x = Mid(S, 2 + floor, floor - 1)
            y = "0" & Right(S, ceil - floor) & "1"
        Case Is < ceil
            x = Mid(S, floor + 1, floor)
            y = Right(S, ceil - floor)
        Case Else
            Dim i As Integer: i = Int(d - ceil + 1)
            x = Mid(S, floor - i + 2, floor - i - 1)
            y = "0" & Right(S, 2 * i + ceil - floor) & "1"
    End Select
    BitSymEncA = BitValue(X & y & StrRev(X))
End Function
```

BitSymDecA (Decodes Data for N-Bit Printed Memory—Embodiment A) Function:

```
Function BitSymDecA(reading, N As Integer) As Double
    ' Excel cell value resolution allows for 15 decimal digits
    ' This is equivalent to 49 binary digits
    ' N should therefore be 1 to 49
    ' and R should be 0 to 2^N - 1
    Dim R As Double: R = CDbl(reading)
    If (N < 1) Or (N > 49) Then
        BitSymDecA = CVErr(xlErrValue)
    ElseIf (R < 0) Or (R >= 2 ^ N) Then
        BitSymDecA = CVErr(xlErrValue)
    End If
    BitSymDecA = 0
    Dim j As Integer
    Dim isPalindrome As Boolean: isPalindrome = True
    Dim floor As Integer: floor = Int(N / 2)
    Dim ceil As Integer: ceil = -Int(-N / 2)
    For j = 0 To ceil - 1
        If (LSB(R, N - 1 - j) = LSB(R, j)) Then
            BitSymDecA = 2 * BitSymDecA + LSB(R, j)
        Else
            isPalindrome = False
            Exit For
        End If
    Next j
    Dim k As Integer
    Dim i As Integer: i = 1 + (2 * floor - 2 - j) Mod (floor)
    Dim kMax As Integer
    If isPalindrome Then
        kMax = floor
    Else
        kMax = N - j - 2
    End If
    If LSB(R, j) = 1 Then
        For k = j + 1 To kMax
            BitSymDecA = 2 * BitSymDecA + LSB(R, N - k - 1)
        Next k
    Else
        For k = j + 1 To kMax
            BitSymDecA = 2 * BitSymDecA + LSB(R, k)
        Next k
    End If
    If Not isPalindrome Then
        BitSymDecA = BitSymDecA + 2 ^ (i + ceil - 1)
    End If
End Function
```

BitSymEncB (Encodes Data for N-Bit Printed Memory—Embodiment B) Function:

```
Function BitSymEncB(value, N As Integer) As Double
    Dim odd As Integer: odd = N Mod 2
    Dim Q As Double: Q = CDbl(value)
    If (N < 1) Or (N > 49) Then
        BitSymEncB = CVErr(xlErrValue)
    ElseIf (Q < 0) Or (Q >= 2 ^ (ceil - 1) * (2 ^ floor + 1)) Then
        BitSymEncB = CVErr(xlErrValue)
    End If
    Dim S As String: S = BitString(Q, N)
    Dim p As Double: p = (Q - odd * CInt(Right(S, 1))) / (1 + odd)
    Dim hp As Double: hp = Int((Sqr(1 + 8 * p) - 1) / 2)
    Dim f As Integer: f = Int(N / 2)
    BitSymEncB = BitValue(BitString(hp, f) & Right(S, odd) &
        StrRev(BitString(p -
        (hp + 1) * hp / 2, f)))
End Function
```

BitSymDecB (Decodes Data for N-Bit Printed Memory—Embodiment B) Function:

```
Function BitSymDecB(reading, N As Integer) As Double
    Dim odd As Integer: odd = N Mod 2
    Dim R As Double: R = CDbl(reading)
    If (N < 1) Or (N > 49) Then
        BitSymDecB = CVErr(xlErrValue)
    ElseIf (R < 0) Or (R >= 2 ^ N) Then
        BitSymDecB = CVErr(xlErrValue)
    End If
    Dim S As String: S = BitString(R, N)
    Dim f As Integer: f = Int(N / 2)
    Dim a As Double: a = BitValue(Left(S, f))
    Dim b As Double: b = BitValue(StrRev(Right(S, f)))
    Dim hp As Double
    If a > b Then
        hp = a
    Else
        hp = b
    End If
    ' p - t_hp = Min(a, b) = a + b - hp
    ' t_hp = hp * (hp + 1) / 2
    ' t_hp - hp = hp *(hp - 1) / 2
    BitSymDecB = (a + b + hp * (hp - 1) / 2) * (1 + odd) +
        odd * CInt(Mid(S, -Int(-N
    / 2), 1))
End Function
```

Alternate Embodiments

Figure 1:
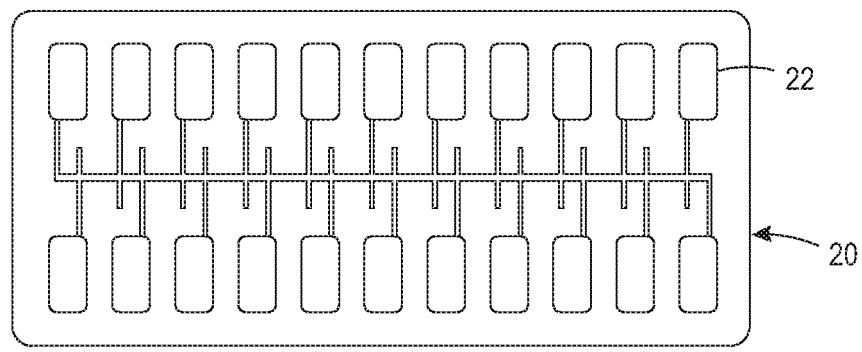
FIG. 1 is a top plan view of an embodiment of a 20-bit printed memory device.
Figure 2:
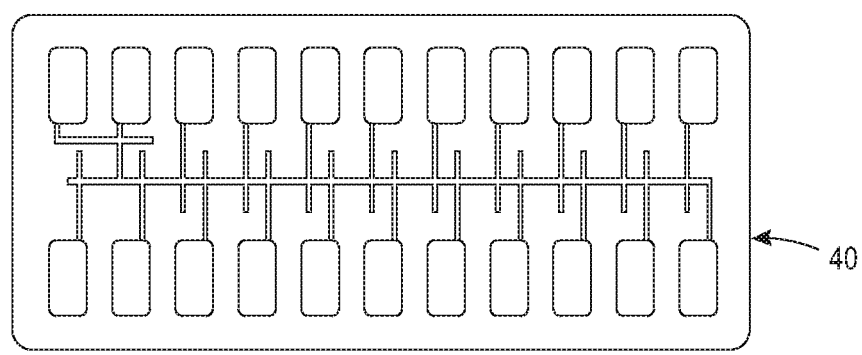
FIG. 2 is a top plan view of an embodiment of a 20-bit printed memory device having connections arranged in an asymmetric pattern to indicate orientation.

An alternate embodiment, hereinafter referred to as Strategy 1, is depicted in FIG. 2 where printed memory label 40 is made asymmetrical, i.e., the leads in the upper portion of label 40 are arranged differently than the leads in the lower portion of label 40. Thus, the contacts in the upper left corner may be used to determine the orientation of label 40 in a reader. Such an arrangement requires the use of switchable contacts to reconfigure the reader according to the orientation of the label. Strategy 1 causes increased cost for the use of printed memory labels, especially for the reader device.

Another alternate embodiment, hereinafter referred to as Strategy 2, is a simple software approach. A symmetrically oriented pair of bits is chosen and then 0 and 1 are written to those bits, respectively. This embodiment uses two bits of memory to establish what is essentially one bit of information, i.e., 0 represents a first orientation and 1 represents a second bit of orientation. For example, the printed memory could include bit 0=0 and bit 19=1, or any symmetrically oriented pair. Thus, the reader could detect the orientation of the symmetrical pair of bits and determine orientation of the label accordingly.

Generally, the presently disclosed algorithms and methods provide a coding scheme for capturing just over N−1 bits of information in an N-bit memory cell, such that reversing the bit order of the N-bits preserves the N−1 bits payload data. Moreover, the present methods can be directly extended to cover the entire set of solutions to the problem statement via transformations including permutation transformations, symmetric bit-swapping transformations and symmetric bit-flipping transformations. The disclosed methods permit payload data to be robust to, i.e., unaffected by, 180° rotation of the PM carrier body. The methods enable a single reader to register bodies of various configurations. The methods may be easily modified for a particular application, device, or user, while also providing a lower cost option than building a reader compatible with both orientations. Moreover, the methods are more efficient than an approach dedicating two bits to orientation determination.

This technology may be used as an optional part of printed memory solutions, as an alternative to more expensive readers, reduced bit capacity, or mechanical means of enforcing orientation. For example, one use may be as a key enabler to use a single reader for a wallet card before and after it has been punched out of its display card. Moreover, although the encoding and decoding actions are in some embodiments described as actions performed by separate devices, e.g., a printed memory reader or a printed memory writer, it is within the scope of the present disclosure to perform both encoding and decoding actions within a common device or unit.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A printed memory reader adapted to determine an original value from a printed memory device comprising a plurality of contact pads and an encoded value created by encoding the original value, the encoded value comprises N bits of data, where N is equal to a number of bits of data stored in the printed memory device, the printed memory reader comprising:
   a plurality of probes arranged to contact the plurality of contact pads;
   a memory storage element comprising instructions programmed to execute the steps:
      a) reading the encoded value or an inverse encoded value from the printed memory device using the plurality of probes to obtain a read value, wherein equivalency between the encoded value and the inverse encoded value is not required; and,
      b) decoding the read value to obtain a decoded value equal to the original value; and,
   a processor arranged to execute the instructions.

2. The printed memory reader of claim 1 wherein decoding the read value comprises determining when the read value is a palindrome value.

3. The printed memory reader of claim 1 wherein when the read value is not a palindrome value, decoding the read value comprises determining when the read value is the encoded value or the inverse encoded value.

4. The printed memory reader of claim 3 wherein decoding the read value comprises:
   determining when the read value is larger than an inverse of the read value; or,
   determining when the read value is smaller than the inverse of the read value.

5. The printed memory reader of claim 3 wherein determining when the read value is the encoded value or the inverse encoded value comprises:
   a) comparing symmetrically oriented bit pairs beginning with an outermost pair and moving inwardly until bits of a compared symmetrically oriented bit pair are non-identical bits; and,
   b) using the non-identical bits to determine when the read value is the encoded value or the inverse encoded value.

6. The printed memory reader of claim 1 wherein when N is an even number, decoding the read value is performed according to:
   a) determining the larger of the read value and an inverse of the read value to establish the encoded value;
   b) determining a triangular number indexed by a first half of the encoded value;
   c) reversing a second half of the encoded value to form a reversed second half value; and,
   d) adding the triangular number to the reversed second half value to obtain the decoded value,
and when N is an odd number, decoding the read value is performed according to:
   a) determining the larger of the read value and an inverse of the read value to establish the encoded value;
   b) determining a center bit of the encoded value;
   c) removing the center bit from the encoded value resulting in a diminished value having N−1 bits;
   d) determining a triangular number indexed by a first half of the diminished value;
   e) reversing a second half of the diminished value to form a reversed second half value; and,
   f) adding the center bit to two times a sum of the triangular number and the reversed second half value to obtain the decoded value.

7. The printed memory reader of claim 1 wherein the printed memory reader is configured to read the encoded value or the inverse encoded value that is a palindrome and configured to read the encoded value or the inverse encoded value that is not a palindrome.

8. A printed memory writer adapted to store an encoded value on a printed memory device comprising a plurality of contact pads, the printed memory writer comprising:
   a plurality of probes arranged to contact the plurality of contact pads;
   a memory storage element comprising instructions programmed to execute the steps:
      a) encoding an original value to form the encoded value comprising N bits of data, where N is equal to a number of bits of data stored in the printed memory device, such that an alternate value cannot yield an alternate encoded value equal to the encoded value or an inverse encoded value, wherein equivalency between the encoded value and the inverse encoded value is not required; and,
      b) storing the encoded value on the printed memory device; and,
   a processor arranged to execute the instructions.

9. The printed memory writer of claim 8 wherein when N is an even number, the encoded value is calculated according to:
   a) determining a largest triangular number that is less than or equal to the original value, the triangular number comprising an index;
   b) calculating a difference between the original value and the largest triangular number;
   c) reversing the difference to form an inverse difference; and,
   d) combining, in order, the index and the inverse difference to form the encoded value,
and when N is an odd number, the encoded value is calculated according to:
   a) determining a least significant bit of the original value;
   b) removing the least significant bit from the original value resulting in a truncated value having N−1 bits;
   c) determining a largest triangular number that is less than or equal to the truncated value, the triangular number comprising an index;
   d) calculating a difference between the truncated value and the largest triangular number;
   e) reversing the difference to form an inverse difference; and,
   f) combining, in order, the index, the least significant bit and the inverse difference to form the encoded value.

10. The printed memory writer of claim 8 wherein the printed memory writer is configured to store the encoded value that is a palindrome and configured to store the encoded value that is not a palindrome.

11. A method of using a printed memory device for storage of an original value comprising:

a) encoding the original value to form an encoded value comprising N bits of data, where N is equal to a number of bits of data stored in the printed memory device, such that an alternate value cannot yield an alternate encoded value equal to the encoded value or an inverse encoded value, wherein equivalency between the encoded value and the inverse encoded value is not required; and, b) storing the encoded value on the printed memory device.

12. The method of using a printed memory device of claim 11 wherein when N is an even number, encoding the original value is performed according to:
   a) determining a largest triangular number that is less than or equal to the original value, the triangular number comprising an index;
   b) calculating a difference between the original value and the largest triangular number;
   c) reversing the difference to form an inverse difference; and,
   d) combining, in order, the index and the inverse difference to form the encoded value, and when N is an odd number, encoding the original value is performed according to:
   a) determining a least significant bit of the original value;
   b) removing the least significant bit from the original value resulting in a truncated value having N−1 bits;
   c) determining a largest triangular number that is less than or equal to the truncated value, the triangular number comprising an index;
   d) calculating a difference between the truncated value and the largest triangular number;
   e) reversing the difference to form an inverse difference; and,
   f) combining, in order, the index, the least significant bit and the inverse difference to form the encoded value.

13. The method of using a printed memory device of claim 11 wherein the step of encoding is configured to permit the encoded value to be a non-palindrome value.

14. A method of using a printed memory device for retrieval of an original value, wherein the original value is encoded to form an encoded value comprising N bits of data, where N is equal to a number of bits of data stored in the printed memory device, the method comprising:
   a) reading the encoded value or an inverse encoded value using a printed memory reader to obtain a read value, wherein equivalency between the encoded value and the inverse encoded value is not required; and,
   b) decoding the read value to obtain the original value.

15. The method of using a printed memory device of claim 14 wherein the step of decoding the read value comprises determining when the read value is a palindrome value.

16. The method of using a printed memory device of claim 14 wherein when the read value is not a palindrome value, the step of decoding the read value comprises determining when the read value is the encoded value or the inverse encoded value.

17. The method of using a printed memory device of claim 16 wherein decoding the read value comprises:
   determining when the read value is larger than an inverse of the read value; or,
   determining when the read value is smaller than the inverse of the read value.

18. The method of using a printed memory device of claim 16 wherein determining when the read value is the encoded value or the inverse encoded value comprises:
   a) comparing symmetrically oriented bit pairs beginning with an outermost pair and moving inwardly until bits of a compared symmetrically oriented bit pair are non-identical bits; and,
   b) using the non-identical bits to determine when the read value is the encoded value or the inverse encoded value.

19. The method of using a printed memory device of claim 14 wherein when N is an even number, decoding the read value is performed according to:
   a) determining the larger of the read value and an inverse of the read value to establish the encoded value;
   b) determining a triangular number indexed by a first half of the encoded value;
   c) reversing a second half of the encoded value to form a reversed second half value; and,
   d) adding the triangular number to the reversed second half value to obtain the decoded value, and when N is an odd number, decoding the read value is performed according to:
   a) determining the larger of the read value and an inverse of the read value to establish the encoded value;
   b) determining a center bit of the encoded value;
   c) removing the center bit from the encoded value resulting in a diminished value having N−1 bits;
   d) determining a triangular number indexed by a first half of the diminished value;
   e) reversing a second half of the diminished value to form a reversed second half value; and,
   f) adding the center bit to two times a sum of the triangular number and the reversed second half value to obtain the decoded value.

20. The method of using a printed memory device of claim 14 wherein the step of reading is configured to permit the encoded value to be a non-palindrome value.

* * * * *